United States Patent

Abt et al.

[11] Patent Number: 5,850,267
[45] Date of Patent: Dec. 15, 1998

[54] NON-ADDITIVE VIDEO MIXER

[75] Inventors: John Abt, Nevada City; James A. Delwiche, Grass Valley, both of Calif.

[73] Assignee: Tektronix, Inc., Wilsonville, Oreg.

[21] Appl. No.: 29,343

[22] Filed: Mar. 10, 1993

Related U.S. Application Data

[63] Continuation of Ser. No. 715,287, Jun. 14, 1991, abandoned.

[51] Int. Cl.$^6$ .................................................. H04N 5/262
[52] U.S. Cl. ........................................... 348/597; 348/599
[58] Field of Search .............................. 358/22, 185, 181, 358/12, 182, 160, 21 R, 146; 348/584, 585, 586, 590, 541, 597, 598, 599; H04N 5/262, 5/265, 5/268, 5/272, 5/275, 5/278, 9/74, 9/75, 9/76

[56] References Cited

U.S. PATENT DOCUMENTS

| | | | |
|---|---|---|---|
| 3,610,822 | 10/1971 | Ingham | 358/105 |
| 3,959,813 | 5/1976 | Legler | 358/22 |
| 4,206,474 | 6/1980 | Herrmann et al. | 358/22 |
| 4,249,212 | 2/1981 | Ito et al. | 358/22 |
| 4,392,156 | 7/1983 | Dura et al. | 358/183 |
| 4,713,693 | 12/1987 | Southwarth et al. | 358/22 |
| 4,771,192 | 9/1988 | Jackson | 307/493 |
| 4,800,432 | 1/1989 | Barnett et al. | 358/160 |
| 4,873,568 | 10/1989 | Jackson et al. | 358/22 |

FOREIGN PATENT DOCUMENTS

| | | | |
|---|---|---|---|
| 2244624 | 4/1973 | Germany | 358/12 |
| 0158585 | 12/1981 | Japan | 358/22 |

*Primary Examiner*—David E. Harvey
*Attorney, Agent, or Firm*—John Smith-Hill; Francis I. Gray

[57] ABSTRACT

To provide an improved non-additive mixer, a first mixer mixes first and second video signals according to a mixer control signal derived in a new way. The first and second video signals are applied, respectively, to first and second chrominance (blocking) filters. The resulting first and second luminance signals are applied, respectively, to first and second summing circuits, where offsets may be applied to either or both of them. The difference is then taken between the first offset luminance signal and the second offset luminance signal to produce a difference luminance signal. The difference luminance signal is then multiplied by a gain control signal to produce the mixer control signal. The mixer control signal can also be used to control a second mixer, thereby providing a channel for keying information that is non-additively mixed according to the luminance content of the video signal that the key information is associated with.

23 Claims, 3 Drawing Sheets

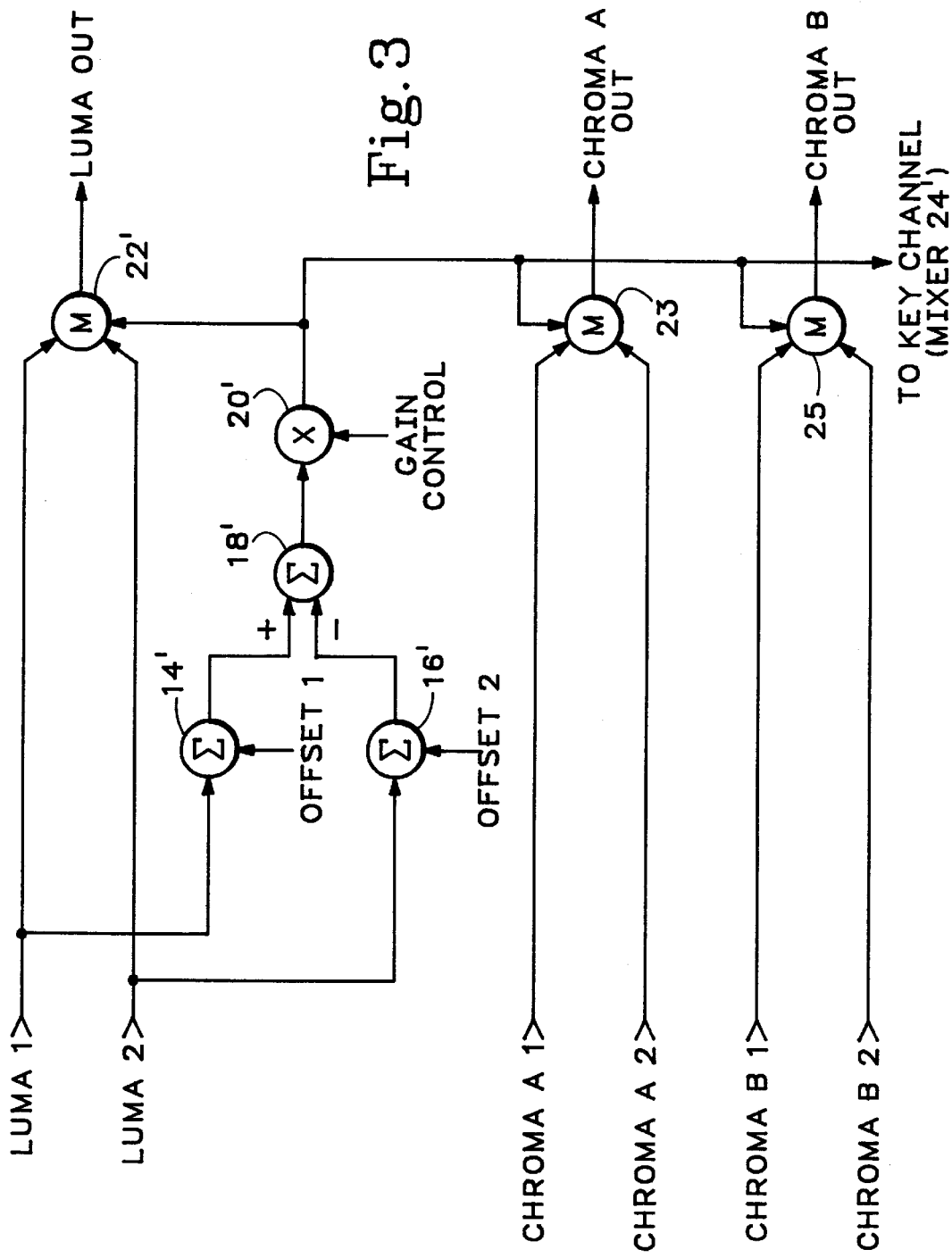

NON-ADDITIVE VIDEO MIXER

This is a continuation of application Ser. No. 07/715,287 filed Jun. 14, 1991 and now abandoned.

BACKGROUND OF THE INVENTION

This invention relates to video signal processing, and more particularly to an improved video non-additive mixer circuit that provides control over the point and rate of transition, immunity to color subcarrier artifacts, and compatibility with shaped video and key signals.

FIG. 1 shows a non-additive mixer (NAM) circuit as known in the prior art. As can be seen in FIG. 1, switching between the two video signals is controlled by a pixel-by-pixel comparison of their magnitudes. Thus, this non-additive mixer allows two video signals to be mixed together based on their local brightness. For some applications non-additive mixing is preferable to the other available forms of mixing, such as additive mixing or self-keyed mixing which may produce unwanted effects in these applications.

Non-additive mixing is most useful in combining images with regions of interest that are very bright against a dark background with other images that are of moderate brightness. For example, non-additive mixing would be an ideal way to superimpose an image of a brightly lit ice skater over another video image with relatively uniform levels of moderate brightness, such as an image of the spectators watching the skating where the latter image is only moderately illuminated. In such a combination, the dark region outside of the spotlight on the skater would permit the other image to be seen clearly, while the bright region within the spotlight would predominate and be visible, blocking the view of the spectators locally.

If these same two images were combined using additive mixing, a lot of visual detail in the vicinity of the skater would be lost. This would occur because the brightness values from the spectators would be added to the already high levels within the spotlight and those sums would exceed the maximum luminance value and have to be limited, washing out a lot of detail. Or, if the same two images are combined by self-keying of the skater's image, self-keying artifacts appear around the edges of the transition between the two images.

In the prior art non-additive mixer shown in FIG. 1, there is no control over the cross-over point between the two images, and no control over the rate at which the transition occurs. Also, when this circuit is used with composite video, chrominance energy from the color subcarrier can produce unwanted effects in the output video. This circuit also does not provide a channel for keying information.

SUMMARY OF THE INVENTION

In accordance with the invention, there is provided an improved non-additive mixer that mixes first and second video signals according to a mixer control signal derived in a new way. In one embodiment, the first and second video signals are applied, respectively, to first and second chrominance (blocking) filters. The resulting first and second luminance signals are applied, respectively, to first and second summing circuits where offsets may be applied to either or both of them. The difference is then taken between the first offset luminance signal and the second offset luminance signal to produce a difference luminance signal. The difference luminance signal is then multiplied by a gain control signal to produce the mixer control signal. The mixer control signal is used to control the mixing of the first and second video signals in a first mixer to provide a non-additively mixed video output. If the first and second video input signals have companion key signals, the mixer control signal can also control a second mixer to provide a key channel output that is non-additively mixed in the same way as the video output.

The subject matter of the present invention is particularly pointed out and distinctly claimed in the concluding portion of this specification. However, both the organization and method of operation, together with further advantages and objects thereof, may best be understood by reference to the following detailed description and accompanying drawings.

BRIEF DESCRIPTION OF THE DRAWINGS

FIG. 3 is a block diagram of another version of the improved non-additive mixer according to the present invention.

DETAILED DESCRIPTION

Figure 2:
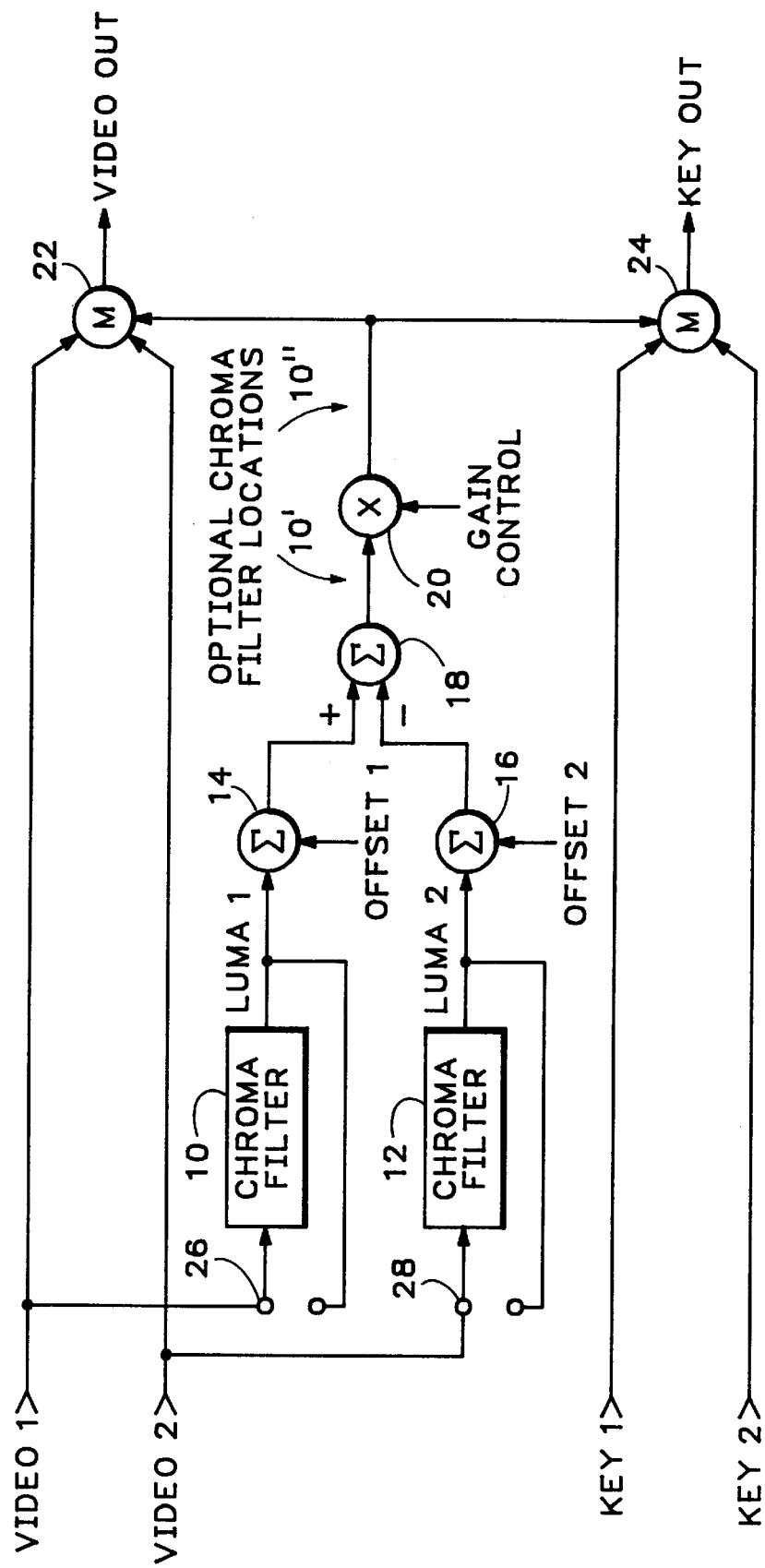
FIG. 2 is a block diagram of an improved non-additive mixer according to the present invention.

Referring now to FIG. 2, an improved non-additive mixer according to the present invention is shown in block diagram form. A first video input is applied to first chrominance (blocking) filter 10 and to one input of mixer 22. A second video input is applied to second chrominance (blocking) filter 12 and the other input of mixer 22. The first chrominance (blocking) filter 10 produces a first luminance signal which is applied to one input of first summing circuit 14. The second chrominance (blocking) filter 12 produces a second luminance signal which is applied to second summing circuit 16.

The first summing circuit 14 receives a first offset signal which is summed with the first luminance signal by the first summing circuit 14 to produce an offset first luminance signal. The second summing circuit 16 receives a second offset signal which is summed with the second luminance signal by the second summing circuit 16 to produce an offset second luminance signal.

The offset first luminance signal and the offset second luminance signal are each applied to one of the inputs of a difference circuit 18. The output of the difference circuit 18 is a difference luminance signal which is applied to multiplier 20. Multiplier 20 multiplies the difference luminance signal by a gain control signal to produce a mixer control signal that varies from 0.0 to 1.0.

The mixer control signal from the multiplier 20 controls first video mixer 22 to determine how much of the first video input and the second video input are present in the video output of the first video mixer 22. The mixing of the two video signals according to the mixer control signal may be performed in any of the ways known in the art, such ways usually implementing the function, $Video_{out} = K*Video_1 + (1-K)*Video_2$, where K is the mixer control signal.

First and second key signals that are associated with the first and second video inputs, respectively, are applied to two inputs of a second mixer 24. The second mixer 24 is also controlled by the mixer control signal so that a key signal output has the same proportions of the first and second key signals as the video output has of the first and second video inputs, respectively.

Figure 1:
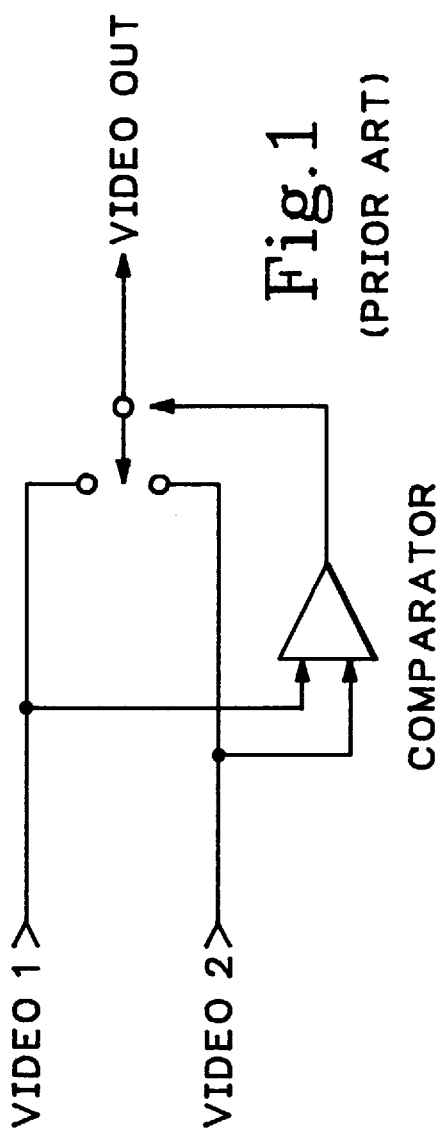
FIG. 1 shows a non-additive mixer as known from the prior art.

The non-additive mixer of the present invention is functionally equivalent to the prior art circuit shown in FIG. 1 when both offset signals are zero and the gain control signal is at maximum, i.e., infinity. Even when used in this way, however, it still is an improvement over the circuit shown in FIG. 1, since the chrominance (blocking) filtering makes the mixing process less susceptible to subcarrier artifacts, and the extra channel for keying information allows the non-additive mixer of the present invention to be used in additional applications that require keying information.

The gain control input to the multiplier 20 can be used to "soften" the transition between two input video signals, allowing for an expanded use of non-additive mixers to produce more subtle effects. Furthermore, the offsetting capability provided by the first and second summing circuits 14 and 16 allows the center point or transition point of the mixer's operation to be adjusted in a way that also allows for new applications of these mixers. While one of these summing circuits with sufficient range could be used to produce any required offset, it is conceptually more convenient to be able to apply offset values to either path.

To permit infinite gain so that the difference circuit 18 and the multiplier 20 can be controlled to operate as a comparator, the multiplier 20 in a digital implementation has to be able to produce an all ones output when only the least significant bit of input is a one. To accomplish this for a 10-bit mixer control signal, a floating point multiplier is used.

A single chrominance (blocking) filter 10' or 10" (not shown) can be disposed after the difference circuit 18 or the multiplier 20 to replace the two 10 and 12 shown on the input paths. For some applications it might be desirable to be able to be able to switch out and bypass the chrominance (blocking) filters 10 and 12 using filter bypass switches 26 and 28.

Referring now to FIG. 3, if the non-additive mixer of the present invention is only to be used in an environment where luminance and chrominance signals are separated, chrominance filtering is not necessary, but additional mixers 23 and 25 are required for the chrominance components. In this embodiment as in the other one, the first summing circuit 14' receives a first offset signal which is summed with the first luminance signal by the first summing circuit 14' to produce an offset first luminance signal. The second summing circuit 16' receives a second offset signal which is summed with the second luminance signal by the second summing circuit 16' to produce an offset second luminance signal.

And, as in FIG. 2, the offset first luminance signal and the offset second luminance signal are each applied to one of the inputs of the difference circuit 18'. The output of the difference circuit 18' is a difference luminance signal which is applied to multiplier 20'. Multiplier 20' multiplies the difference luminance signal by a gain control signal to produce a mixer control signal.

In this embodiment, the mixer control signal from the multiplier 20' controls three video mixers 22', 23 and 25 to determine how much of the first and second video luminance and chrominance components A and B (representing I and Q or U and V) are to be present in the video luminance and chrominance A and B outputs. The same mixer control signal can also control the mixer (24', not shown) for an additional channel of keying information, as in FIG. 2.

While a preferred embodiment of the present invention has been shown and described, it will be apparent to those skilled in the art that many changes and modifications may be made without departing from the invention in its broader aspects. For example, difference circuit 18 and multiplier 20 can be implemented with a standard clip and gain circuit, with one of the difference inputs coupled to the clipping level input. And, while a digital implementation is generally preferred, there is no reason in principle why part or all of this circuitry could not be analog. The claims that follow are therefore intended to cover all such changes and modifications as fall within the true scope of the invention.

We claim:

1. A non-additive mixer for video signals, comprising:
    a first chrominance (blocking) filter for receiving a first video input and producing a first luminance signal;
    a second chrominance (blocking) filter for receiving a second video input and producing a second luminance signal;
    summation means coupled to receive the first luminance signal and the second luminance signal and producing a mixer control signal that is a linear function of the difference between the first luminance signal and the second luminance signal; and
    a mixer coupled to receive the first video input and the second video input and producing a video output representative of the product of the first video input and the mixer control signal plus the product of the second video input and the complement of the mixer control signal.

2. A non-additive mixer according to claim 1, wherein the summation means is coupled to receive the first luminance signal and the second luminance signal and produces an output signal dependent on the difference between the first luminance signal and the second luminance signal, and further comprises a multiplier coupled to receive the output signal and multiply it by a gain control signal to produce the mixer control signal.

3. A non-additive mixer according to claim 2, wherein the summation means is coupled to receive a first offset signal and the output signal is dependent on the difference between the first luminance signal and the second luminance signal plus the first offset signal.

4. A non-additive mixer according to claim 3, wherein the summation means is coupled to receive a second offset signal and the output signal is dependent on the difference between the first luminance signal and the second luminance signal plus the first offset signal minus the second offset signal.

5. A non-additive mixer according to claim 1, further comprising a second mixer coupled to receive a first key signal associated with the first video input and a second key signal associated with the second video input, and producing a key output signal according to the mixer control signal.

6. A non-additive mixer for video signals, comprising:
    summation means coupled to receive a first video input and a second video input and producing an output signal dependent on the difference between the first and second video inputs;
    a chrominance (blocking) filter for receiving the output signal and producing a filtered output signal;
    a multiplier coupled to receive the filtered output signal and multiply it by a gain control signal to produce a mixer control signal that is a linear function of the difference between a luminance component of the first video input and a luminance component of the second video inputs; and
    a mixer coupled to receive the first video input and the second video input and producing a video output representative of the product of the first video input and the mixer control signal plus the product of the second video input and the complement of the mixer control signal.

7. A non-additive mixer according to claim 6, wherein the summation means comprises:
   a difference circuit coupled to receive the first video input and the second video input and producing a difference signal dependent on the difference between the first video input and the second video input; and
   a multiplier coupled to receive the difference signal and multiply it by a gain control signal to produce the output signal.

8. A method for non-additively mixing video signals, the method comprising the steps of:
   chrominance (blocking) filtering a first video input to produce a first luminance signal;
   chrominance (blocking) filtering a second video input to produce a second luminance signal;
   forming a mixer control signal that is a linear function of the difference between the first luminance signal and the second luminance signal; and
   combining the first video input and the second video input to produce a video output representative of the product of the first video input and the mixer control signal plus the product of the second video input and the complement of the mixer control signal.

9. A method for non-additively mixing according to claim 8, wherein the step of forming the mixer control signal comprises:
   forming a difference signal dependent on the difference between the first and second luminance signals; and
   multiplying the difference signal by a gain control signal to produce the mixer control signal.

10. A method for non-additively mixing according to claim 8, wherein the step of forming the mixer control signal comprises adding a first offset signal, whereby the mixer control signal is dependent upon the difference between the first and second luminance signals plus the first offset signal.

11. A method for non-additively mixing according to claim 10, wherein the step of forming the mixer control signal comprises subtracting a second offset signal, whereby the mixer control signal is dependent upon the difference between the first and second luminance signals plus the first offset signal minus the second offset signal.

12. A method for non-additively mixing according to claim 8, further comprising the step of:
   combining a first key signal associated with the first video input and a second key signal associated with the second video input according to the mixer control signal to produce a key output signal.

13. A method for non-additively mixing video signals, the method comprising the steps of:
   forming a summation output signal dependent upon the difference between a first video input and a second video input;
   chrominance (blocking) filtering the summation output signal to produce a filtered output signal;
   multiplying the filtered output signal by a gain control signal to produce a mixer control signal that is a linear function of the difference between a luminance component of the first video input and a luminance component of the second video input; and
   combining the first video input and the second video input to produce a video output representative of the product of the first video input and the mixer control signal plus the product of the second video input and the complement of the mixer control signal.

14. A method for non-additively mixing according to claim 13, wherein the step of forming the summation output signal comprises:
   forming a difference signal dependent upon the difference between the first and second video inputs; and
   multiplying the difference signal by a gain control signal to produce the summation output signal.

15. A method for non-additively mixing according to claim 13, further comprising the step of:
   combining a first key signal associated with the first video input and a second key signal associated with the second video input according to the filtered output signal to produce a key output signal.

16. A method for non-additively mixing according to claim 13, wherein the step of forming the summation output signal further comprises adding a first offset signal, whereby the summation output signal is dependent upon the difference between the first and second video inputs plus the first offset signal.

17. A non-additive mixer for component video signals each having a luminance component and chrominance A and chrominance B components associated therewith, said non-additive mixer comprising:
   summation means for producing a mixer control signal that is a linear function of the difference between a first luminance input component and a second luminance input component;
   a luminance mixer coupled to receive the first and second luminance input components and producing a luminance output component representative of the product of the first luminance input component and the mixer control signal plus the product of the second luminance input component and the complement of the mixer control signal;
   a first chrominance mixer coupled to receive the chrominance A components associated with the first and second luminance input components respectively and producing a chrominance A output component representative of the product of the chrominance A component associated with the first luminance input component and the mixer control signal plus the product of the chrominance A component associated with the second luminance input component and the complement of said mixer control signal; and
   a second chrominance mixer coupled to receive the chrominance B components associated with the first and second luminance input components respectively and producing a chrominance B output component representative of the product of the chrominance B component associated with the first luminance input component and the mixer control signal plus the product of the chrominance B component associated with the second luminance input component and the complement of said mixer control signal.

18. A non-additive mixer according to claim 17, wherein the summation means is coupled to receive the first and second luminance input components and produces an output signal dependent upon the difference between the first and second luminance input components, and further comprises a multiplier coupled to receive the output signal and multiply it by a gain control signal to produce the mixer control signal.

19. A non-additive mixer according to claim 18, wherein the summation means is coupled to receive a first offset signal and the output signal is dependent upon the difference between the first and second luminance input components plus the first offset signal.

20. A non-additive mixer according to claim 19, wherein the summation means is coupled to receive a second offset signal and the output signal is dependent upon the difference between the first and second luminance input components plus the first offset signal minus the second offset signal.

21. A method for non-additively mixing component video signals each having a luminance component and chrominance A and chrominance B components, the method comprising the steps of:

forming a mixer control signal that is a linear function of the difference between a first luminance input component and a second luminance input component;

combining the first and second luminance input components to produce a luminance output component representative of the product of the first luminance input component and the mixer control signal plus the product of the second luminance input component and the complement of the mixer control signal;

combining the chrominance A components associated with the first and second luminance input components respectively to produce a chrominance A output component representative of the product of the chrominance A component associated with the first luminance input component and the mixer control signal plus the product of the chrominance A component associated with the second luminance input component and the complement of the mixer control signal; and combining the chrominance B components associated with the first and second luminance input components respectively to produce a chrominance B output component representative of the product of the chrominance B component associated with the first luminance input component and the mixer control signal plus the product of the chrominance B component associated with the second luminance input component and the complement of the mixer control signal.

22. A method for non-additively mixing component video signals according to claim 21, wherein the step of forming the mixer control signal comprises:

forming a difference signal dependent on the difference between the first and second luminance input components; and multiplying the difference signal by a gain control signal to produce the mixer control signal.

23. A method for non-additively mixing component video signals according to claim 21, wherein the step of forming the mixer control signal comprises adding a first offset signal, whereby the mixer control signal is dependent on the difference between the first and second luminance input components plus the first offset signal.

* * * * *